US010249392B2

(12) United States Patent
Shargots et al.

(10) Patent No.: US 10,249,392 B2
(45) Date of Patent: *Apr. 2, 2019

(54) METHOD OF FORMING A SUPPORT STRUCTURE FOR A CONTROL ROD ASSEMBLY OF A NUCLEAR REACTOR

(71) Applicant: BWXT mPower, Inc., Charlotte, NC (US)

(72) Inventors: Scott J. Shargots, Forest, VA (US); Matthew W. Ales, Issaquah, WA (US)

(73) Assignee: BWXT mPower, Inc., Charlotte, NC (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/147,262

(22) Filed: May 5, 2016

(65) Prior Publication Data

US 2016/0247584 A1 Aug. 25, 2016

Related U.S. Application Data

(62) Division of application No. 12/909,252, filed on Oct. 21, 2010, now Pat. No. 9,378,853.

(51) Int. Cl.
*G21C 7/117* (2006.01)
*G21C 7/08* (2006.01)
(Continued)

(52) U.S. Cl.
CPC ............... *G21C 7/08* (2013.01); *G21C 7/117* (2013.01); *G21C 7/12* (2013.01); *G21C 21/18* (2013.01);
(Continued)

(58) Field of Classification Search
CPC .................................................... G21C 7/117
See application file for complete search history.

(56) References Cited

U.S. PATENT DOCUMENTS 3,015,616 A 1/1962 Stuartz et al.
3,212,978 A 10/1965 Short et al.
(Continued)

FOREIGN PATENT DOCUMENTS

CN 1515011 A 7/2004
JP 62-044686 A 2/1987
(Continued)

OTHER PUBLICATIONS

Heliang Zhou, "Manual of Electrical Engineer", Beijing Electric Press, Apr. 30, 2008 (Section 3.1 of Chapter 3 of Part 15).
(Continued)

*Primary Examiner* — Sharon M Davis
(74) *Attorney, Agent, or Firm* — Nelson Mullins Riley & Scarborough LLP

(57) ABSTRACT

A control rod guide frame comprises a self supporting stack of two or more columnar elements defining a central passage. The columnar elements may include mating features that mate at abutments between adjacent columnar elements of the stack. The control rod guide frame is suitably used in conjunction with a control rod drive mechanism (CRDM) operatively connected with at least one control rod, and a nuclear reactor core, in which the CRDM moves the at least one control rod into and out of the nuclear reactor core under guidance of the control rod guide frame. In another embodiment, a control rod guide frame comprises a stack of two or more columnar elements defining a central passage having a constant cross-section as a function of position along the central passage. In another embodiment, a control rod guide frame comprises an extruded columnar element providing continuous control rod guidance.

15 Claims, 11 Drawing Sheets

(51) Int. Cl.
*G21C 7/12* (2006.01)
*G21C 21/18* (2006.01)
(52) U.S. Cl.
CPC ......... *G21Y 2002/104* (2013.01); *Y02E 30/39* (2013.01)

(56) References Cited

U.S. PATENT DOCUMENTS

| | | |
|---|---|---|
| 3,379,619 A | 4/1968 | Andrews et al. |
| 3,527,670 A | 9/1970 | Winders et al. |
| 3,607,629 A | 9/1971 | Frisch et al. |
| 3,650,895 A | 3/1972 | Sodergard |
| 3,734,825 A | 5/1973 | Schabert et al. |
| 3,853,699 A | 12/1974 | Frisch et al. |
| 3,853,702 A | 12/1974 | Bevilacqua et al. |
| 3,857,599 A | 12/1974 | Jones et al. |
| 3,959,072 A | 5/1976 | Dupen |
| 4,057,467 A | 11/1977 | Kostrzewa |
| 4,072,563 A | 2/1978 | McDonald et al. |
| 4,124,442 A | 11/1978 | Zhuchkov et al. |
| 4,175,004 A | 11/1979 | Jabsen |
| 4,187,145 A | 2/1980 | Noyes et al. |
| 4,219,386 A | 8/1980 | Osborne et al. |
| 4,231,843 A | 11/1980 | Myron et al. |
| 4,235,674 A | 11/1980 | Yue |
| 4,252,613 A | 2/1981 | Jabsen |
| 4,313,797 A | 2/1982 | Attix |
| 4,420,456 A | 12/1983 | Nickel et al. |
| 4,472,348 A | 9/1984 | Desfontaines |
| 4,484,093 A | 11/1984 | Smith |
| 4,562,038 A | 12/1985 | Assedo et al. |
| 4,569,705 A | 2/1986 | Allan |
| 4,598,738 A | 7/1986 | Weber et al. |
| 4,618,471 A | 10/1986 | Defaucheux et al. |
| 4,640,811 A | 2/1987 | Peletan |
| 4,663,576 A | 5/1987 | Scarola et al. |
| 4,678,623 A | 7/1987 | Malandra et al. |
| 4,681,728 A | 7/1987 | Veronesi et al. |
| 4,683,106 A | 7/1987 | Jahnke |
| 4,687,628 A | 8/1987 | Gillett et al. |
| 4,759,904 A | 7/1988 | Gillett et al. |
| 4,762,669 A | 8/1988 | Doshi |
| 4,857,264 A | 8/1989 | Veronesi et al. |
| 4,857,265 A | 8/1989 | Pol et al. |
| 4,863,678 A | 9/1989 | Shockling et al. |
| 4,876,061 A | 10/1989 | Ekeroth et al. |
| 4,885,127 A | 12/1989 | Yokoyama |
| 4,888,151 A | 12/1989 | Gjertsen et al. |
| 4,895,698 A | 1/1990 | DeMario |
| 4,902,468 A | 2/1990 | Veronesi et al. |
| 4,923,669 A | 5/1990 | DeMario |
| 4,957,697 A | 9/1990 | Wada |
| 4,963,318 A | 10/1990 | Johansson et al. |
| 4,966,745 A | 10/1990 | Widener et al. |
| 4,975,239 A | 12/1990 | O'Neil et al. |
| 4,983,351 A | 1/1991 | Tower et al. |
| 4,986,954 A | 1/1991 | Feurgard |
| 4,990,304 A | 2/1991 | Rylatt |
| 4,993,864 A | 2/1991 | Gjertsen et al. |
| 4,994,233 A | 2/1991 | Freeman |
| 4,996,018 A | 2/1991 | Bhatt et al. |
| 5,006,305 A | 4/1991 | Denizou |
| 5,009,837 A | 4/1991 | Nguyen et al. |
| 5,024,806 A | 6/1991 | Cioffi et al. |
| 5,024,808 A | 6/1991 | Land et al. |
| 5,030,413 A | 7/1991 | Knierriem et al. |
| 5,043,134 A | 8/1991 | Widener et al. |
| 5,064,607 A | 11/1991 | Miller et al. |
| 5,068,083 A | 11/1991 | John, Jr. et al. |
| 5,141,711 A | 8/1992 | Gjertsen et al. |
| 5,158,740 A | 10/1992 | Boatwright |
| 5,183,628 A | 2/1993 | Baujat et al. |
| 5,200,138 A | 4/1993 | Ferrari |
| 5,207,978 A | 5/1993 | Barbe |
| 5,207,980 A | 5/1993 | Gilmore et al. |
| 5,227,125 A | 7/1993 | Beneck et al. |
| 5,237,595 A | 8/1993 | Woodcock |
| 5,241,570 A | 8/1993 | Challberg |
| 5,265,137 A | 11/1993 | Busch |
| 5,268,948 A | 12/1993 | Church et al. |
| 5,276,719 A | 1/1994 | Batheja et al. |
| 5,282,231 A | 1/1994 | Adams et al. |
| 5,282,233 A | 1/1994 | Bryan |
| 5,299,246 A | 3/1994 | Bryan |
| 5,328,667 A | 7/1994 | Johnson |
| 5,361,279 A | 11/1994 | Kobsa et al. |
| 5,367,549 A | 11/1994 | Hatfield |
| 5,386,440 A | 1/1995 | Kashiwai et al. |
| 5,436,945 A | 7/1995 | Weisel et al. |
| 5,513,234 A | 4/1996 | Rottenberg |
| 5,606,582 A | 2/1997 | Bergamaschi |
| 5,625,657 A | 4/1997 | Gallacher |
| 5,640,434 A | 6/1997 | Rottenberg |
| 5,715,288 A | 2/1998 | Matteson |
| 5,841,824 A | 11/1998 | Graham |
| 5,844,958 A | 12/1998 | Leroux et al. |
| 5,930,321 A | 7/1999 | Harkness et al. |
| 6,055,288 A | 4/2000 | Schwirian |
| 6,088,420 A | 7/2000 | Yokoyama et al. |
| 6,091,790 A | 7/2000 | Ridolfo |
| 6,097,779 A | 8/2000 | Challberg et al. |
| 6,130,927 A | 10/2000 | Kang et al. |
| 6,167,104 A | 12/2000 | Garzarolli et al. |
| 6,236,699 B1 | 5/2001 | Ridolfo |
| 6,275,557 B2 | 8/2001 | Nylund et al. |
| 6,421,405 B1 | 7/2002 | Ridolfo |
| 6,477,219 B2 | 11/2002 | Hirukawa et al. |
| 6,489,623 B1 | 12/2002 | Peters et al. |
| 6,636,578 B1 | 10/2003 | Clark |
| 6,636,580 B2 | 10/2003 | Murakami et al. |
| 6,810,099 B2 | 10/2004 | Nakamaru et al. |
| 6,819,733 B2 | 11/2004 | Broders et al. |
| 6,865,242 B2 | 3/2005 | Barbe et al. |
| 6,895,067 B2 | 5/2005 | Borum et al. |
| 7,085,340 B2 | 8/2006 | Goldenfield et al. |
| 7,257,185 B1 | 8/2007 | Yamada et al. |
| 7,280,946 B2 | 10/2007 | Russell, II et al. |
| 7,289,590 B2 | 10/2007 | Joly et al. |
| 7,412,021 B2 | 8/2008 | Fetterman et al. |
| 7,424,412 B2 | 9/2008 | Kropaczek et al. |
| 7,428,479 B2 | 9/2008 | Boer et al. |
| 7,453,972 B2 | 11/2008 | Hellandbrand, Jr. et al. |
| 7,526,058 B2 | 4/2009 | Fawcett et al. |
| 7,548,602 B2 | 6/2009 | Smith, III et al. |
| 7,561,654 B2 | 7/2009 | Makovicka et al. |
| 7,574,337 B2 | 8/2009 | Kropaczek et al. |
| 7,668,280 B2 | 2/2010 | Hellandbrand, Jr. et al. |
| 7,668,284 B2 | 2/2010 | Sparrow et al. |
| 7,672,418 B2 | 3/2010 | Aktas et al. |
| 8,102,961 B2 | 1/2012 | Aktas et al. |
| 2003/0123600 A1 | 7/2003 | Hesketh et al. |
| 2003/0169839 A1 | 9/2003 | Matteson |
| 2005/0069080 A1 | 3/2005 | Goldenfield et al. |
| 2006/0153327 A1 | 7/2006 | Jiang |
| 2006/0207672 A1 | 9/2006 | Henriksson et al. |
| 2006/0222140 A1 | 10/2006 | Aleshin et al. |
| 2006/0251205 A1 | 11/2006 | Balog |
| 2007/0133732 A1 | 6/2007 | Nakayama et al. |
| 2007/0206717 A1 | 9/2007 | Conner et al. |
| 2008/0084957 A1 | 4/2008 | Aleshin et al. |
| 2008/0145174 A1 | 6/2008 | Suzuki et al. |
| 2008/0253496 A1 | 10/2008 | McCarty et al. |
| 2008/0253497 A1 | 10/2008 | Singleton et al. |
| 2009/0032178 A1 | 2/2009 | Feinroth |
| 2009/0060114 A1 | 3/2009 | Defilippis |
| 2009/0122946 A1 | 5/2009 | Fawcett et al. |
| 2010/0150294 A1 | 6/2010 | Weisel et al. |
| 2010/0316177 A1 | 12/2010 | Stambaugh et al. |
| 2010/0316181 A1 | 12/2010 | Thome et al. |
| 2011/0222640 A1 | 9/2011 | Desantis |
| 2012/0014493 A1 | 1/2012 | Frank et al. |
| 2012/0051482 A1 | 3/2012 | Shargots et al. |

(56) References Cited

U.S. PATENT DOCUMENTS

2012/0069947 A1 3/2012 Ketcham et al.
2012/0076254 A1 3/2012 Malloy et al.
2012/0099691 A1 4/2012 Shargots et al.

FOREIGN PATENT DOCUMENTS

| JP | 01-147396 A | 6/1989 |
| JP | H0-9166681 A | 6/1997 |
| JP | 2003130981 A | 5/2003 |
| TW | 255969 B | 9/1995 |
| TW | 200845042 A | 11/2008 |

OTHER PUBLICATIONS

International Search Report and Written Opinion for PCT/US2011/052495 dated Feb. 10, 2012.
Taiwan Office Action for Application No. 100135243 dated Dec. 17, 2014.
Chinese Office Action for Application No. 201180004745.X dated Feb. 4, 2015.
Japanese Office Action for Application No. 2013-534915 dated Feb. 24, 2015.
Office Action dated Dec. 17, 2015 for Chinese Application No. 201180004745.X.
Office Action dated Feb. 20, 2016 for Russian Patent Application No. 2013118106.
Extended European Search Report, European Application No. 11834807.7, dated Jun. 30, 2017, 9 pages.
Office Action, Canadian Application No. 2,825,125, dated Jul. 31, 2017, 4 pages.
Office Action, Japanese Application No. 2016-53594, dated Dec. 20, 2016, 5 pages.

SECTION A-A

SECTION B-B

METHOD OF FORMING A SUPPORT STRUCTURE FOR A CONTROL ROD ASSEMBLY OF A NUCLEAR REACTOR

CLAIM OF PRIORITY

This application is a division of U.S. patent application Ser. No. 12/909,252, filed Oct. 21, 2010, now U.S. Pat. No. 9,378,853, the entire disclosure of which is incorporated by reference herein.

BACKGROUND

The following relates to the nuclear power reactor arts, nuclear reaction control apparatus arts, control rod assembly arts, and related arts.

In nuclear power plants, a nuclear reactor core comprises a fissile material having size and composition selected to support a desired nuclear fission chain reaction. To moderate the reaction, a neutron absorbing medium may be provided, such as light water ($H_2O$) in the case of light water reactors, or heavy water ($D_2O$) in the case of heavy water reactors. The reaction may be controlled or stopped by inserting "control rods" comprising a neutron-absorbing material into aligned passages within the reactor core. When inserted, the control rods absorb neutrons so as to slow or stop the chain reaction. The control rods are operated by control rod drive mechanisms (CRDMs). In so-called "gray" control rods, the insertion of the control rods is continuously adjustable so as to provide continuously adjustable reaction rate control. In so-called "shutdown" control rods, the insertion is either fully in or fully out. During normal operation the shutdown rods are fully retracted from the reactor core; during a SCRAM, the shutdown rods are rapidly fully inserted so as to rapidly stop the chain reaction. Control rods can also be designed to perform both gray rod and shutdown rod functions. Typically, a number of control rods are connected with a single CRDM by an assembly including a connecting rod coupled with the CRDM and terminating in a "spider" or other coupling element that supports the plural control rods. In such an assembly, the CRDM moves the plural control rods, along with the spider and the connecting rod, together as a unit.

When the control rods are partially or wholly withdrawn from the reactor core, they are supported by a control rod guide frame so as to ensure that the control rods remain in precise alignment with the aligned passages within the reactor core. In one typical guide frame configuration, a plurality of spaced apart guide plates are secured together by a frame. In operation, the control rods are guided by openings in the guide plates. Such a guide frame design has advantages including low weight and material cost, and limited impedance of primary coolant flow due to the largely open design. The use of guide plates to define the control rod guiding surfaces also provides a convenient planar form for the precision metalwork.

BRIEF SUMMARY

In one aspect of the disclosure, an apparatus comprises a control rod guide frame comprising a stack of two or more columnar elements defining a central passage having a constant cross-section as a function of position along the central passage.

In another aspect of the disclosure, an apparatus comprises: a control rod guide frame comprising a stack of two or more columnar elements defining a central passage having a constant cross-section as a function of position along the central passage; a control rod assembly comprising at least one control rod parallel aligned with the central passage of the control rod guide frame; wherein the at least one control rod is movable into and out of the central passage of the control rod guide frame; and wherein any portion of the at least one control rod disposed in the central passage is guided by the central passage over the entire length of the portion of the at least one control rod that is disposed in the central passage In another aspect of the disclosure, an apparatus as set forth in the immediately preceding paragraph is disclosed, further comprising: a control rod drive mechanism (CRDM) operatively connected with the control rod assembly to control movement of the at least one control rod into and out of the central passage of the control rod guide frame; a nuclear reactor core; and a reactor pressure vessel containing at least the nuclear reactor core, the control rod guide frame, and the at least one control rod; wherein as the at least one control rod moves out of the central passage of the control rod guide frame it moves into the nuclear reactor core and as the at least one control rod moves into the central passage of the control rod guide frame it moves out of the nuclear reactor core.

In another aspect of the disclosure, an apparatus comprises: a control rod assembly comprising a plurality of control rods; and a control rod guide frame defining a central passage into which the at least one control rod can be withdrawn, the central passage providing continuous guidance along the entire length of the portion of each control rod of the plurality of control rods that is withdrawn into the central passage.

In another aspect of the disclosure, an apparatus comprises a control rod guide frame comprising a self-supporting stack of two or more columnar elements defining a central passage.

In another aspect of the disclosure, an apparatus comprises a control rod guide frame comprising a self-supporting stack of two or more columnar elements defining a central passage, wherein the control rod guide frame does not include an exoskeleton supporting the self-supporting stack of two or more columnar elements.

In another aspect of the disclosure, an apparatus as set forth in either one of the two immediately preceding paragraphs is disclosed, wherein the columnar elements include mating features that mate at abutments between adjacent columnar elements of the stack. In another aspect of the disclosure, an apparatus as set forth in either one of the two immediately preceding paragraphs is disclosed, further comprising a control rod drive mechanism (CRDM) operatively connected with a control rod assembly, and a nuclear reactor core, wherein the CRDM moves at least one control rod into and out of the nuclear reactor core under guidance of the control rod guide frame.

In another aspect of the disclosure, a method comprises forming at least one columnar element defining a central passage, and constructing a control rod guide frame including the at least one columnar element.

In another aspect of the disclosure, a method comprises forming a plurality of columnar elements each defining a central passage, and constructing a control rod guide frame by stacking the columnar elements end-to-end.

In another aspect of the disclosure, a method as set forth in either one of the two immediately preceding paragraphs is disclosed, wherein the forming comprises extruding at least one columnar element defining a central passage. In another aspect of the disclosure, a method as set forth in either one of the two immediately preceding paragraphs is disclosed, wherein the forming comprises casting at least one columnar element defining a central passage. In another aspect of the disclosure, a method as set forth in either one of the two immediately preceding paragraphs is disclosed, wherein the forming comprises forming at least one columnar element defining a central passage using electrical discharge machining (EDM).

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
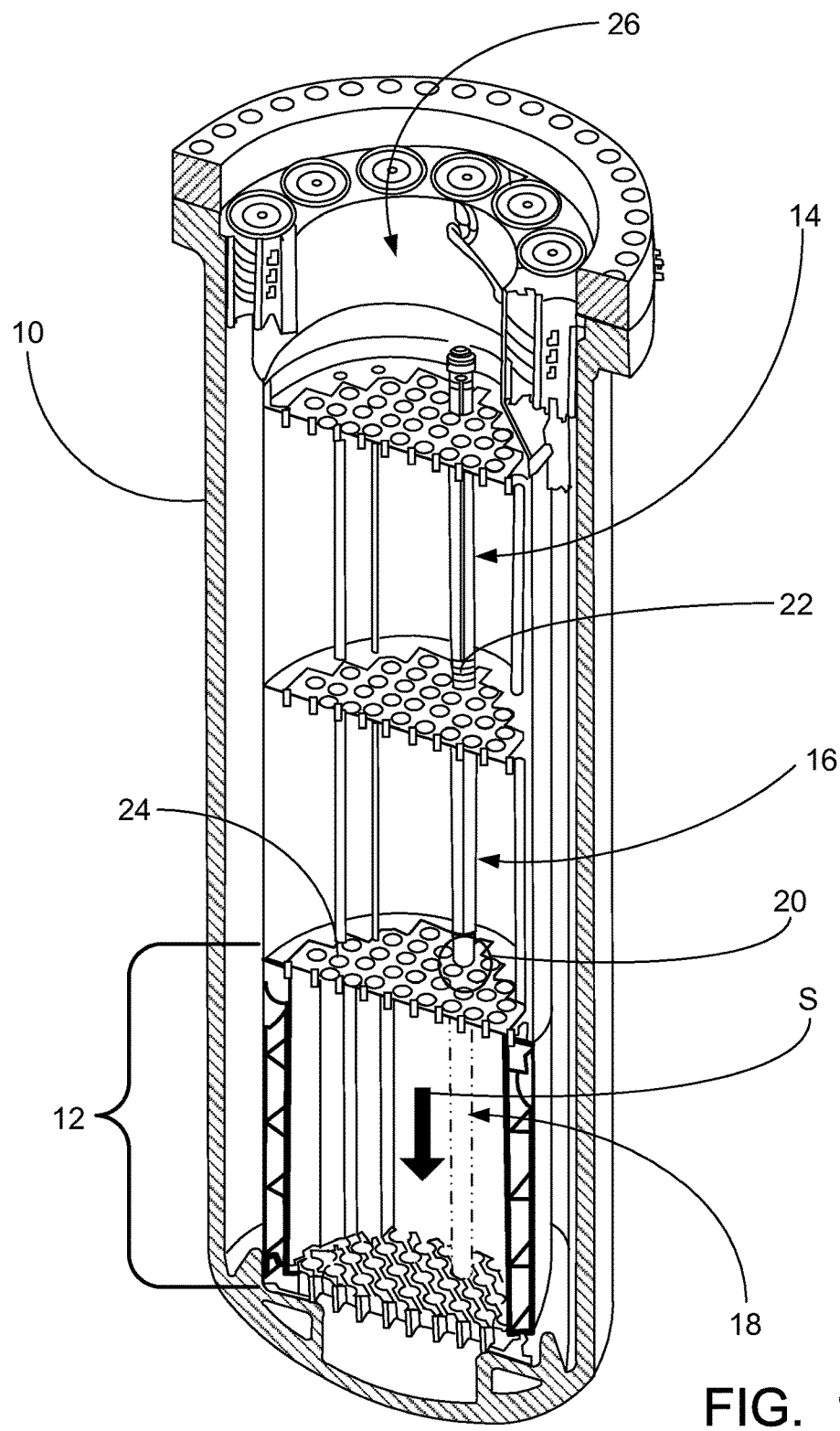
FIG. 1 diagrammatically shows a perspective sectional view a lower portion of an illustrative nuclear reactor pressure vessel including an illustrative continuous control rod guide frame.

An open control rod guide frame comprising spaced apart guide plates secured together by an exterior frame has advantages including low weight and material cost, limited primary coolant flow impedance, and manufacturing convenience. However, numerous disadvantages of this guide frame configuration are recognized herein. The spacing apart of the guide plates can potentially allow bowing of the control rods upon insertion if there is sufficient drag. Such bowing can cause the control rod assembly (that is, the plural control rods secured together to a connecting rod by a single spider or other coupling element) to get stuck within the guide frame and not allow it to be inserted into the nuclear core. Such a failure in the case of gray rods is at least a substantial inconvenience, and could require opening the reactor vessel for repair if the gray rods are essential to maintain acceptable reactivity control. In the case of hybrid and/or shutdown rods, bowing-induced rod insertion failure could hinder or even prevent successful SCRAM of a malfunctioning reactor, thus raising serious safety issues.

An issue related to the potential rod bowing is shutdown speed and robustness. The rate at which the hybrid or control rods are inserted during a SCRAM impacts the shutdown speed. Potential rod bowing in the spaces between guide plates imposes an upper limit on the force (and hence speed) with which the control rods can be driven toward the reactor core, since too much force could cause control rod bending. The limited driving force can also adversely impact reliability. There is the potential for blockage or impediment to rod insertion into the reactor core. Sources of blockage or impediment include, for example, sediment or other contamination within the reactor vessel, or a burr or other defect in the guiding surfaces of the guide plate and/or the aligned passages within the reactor core, or so forth, possibly aggravated by thermal expansion during an elevated reactivity incident. Any such blockage or impediment is less likely to be overcome by a reduced driving force during rod SCRAM, thus raising the likelihood of a SCRAM failure.

Another issue with using spaced apart guide plates is that the spider or other connecting element is not always aligned with any particular guide plate. When the spider is between spaced apart guide plates it is susceptible to movement due to any horizontal forces, for example due to horizontal primary coolant flow components, or movement of the reactor vessel itself (for example, during an earthquake, or at any time in the case of a maritime reactor). Any horizontal movement of the spider increases likelihood of misalignment and consequent failure of the control rods attached to the spider.

Yet another issue with using spaced apart guide frames is the potential for flow induced vibrations acting on the control rods. For example, if the guide plates are treated as vibrational "null" points, the spaced apart guide plates may support natural vibration modes having wavelengths (or "half-wavelengths") that are multiples of the spacing between the guide plates. Such vibrations can adversely impact stability of the reactivity control and can contribute to material fatigue and ultimately to failure of the control rods.

It is recognized herein that these difficulties are alleviated by a guide frame providing continuous support. In such a case, rod bowing is suppressed or prevented entirely. This allows the use of greater force in driving the control rods into the core during a SCRAM, thus improving reactivity shutdown speed and reliability. The spider or other connecting element is also supported by the guide frame at every point in its travel between the fully withdrawn and fully inserted control rod positions. Vibrations are also suppressed or eliminated entirely by the continuous support.

With reference to FIG. 1, a relevant portion of an illustrative nuclear reactor pressure vessel 10 includes a core former 12 located proximate to a bottom of the pressure vessel 10. The core former 12 includes or contains a reactive core (not shown) containing or including radioactive material such as, by way of illustrative example, enriched uranium oxide (that is, $UO_2$ processed to have an elevated $^{235}U/^{238}U$ ratio). A control rod drive mechanism (CRDM) unit 14 is diagrammatically illustrated. The illustrative CRDM 14 is an internal CRDM that is disposed within the pressure vessel 10; alternatively, an external CRDM may be employed. FIG. 1 shows the single illustrated CRDM unit 14 as an illustrative example; however, more generally there are typically multiple CRDM units each coupled with a different plurality of control rods (although these additional CRDM units are not shown in FIG. 1, the pressure vessel 10 is drawn showing the space for such additional CRDM units).

Below the CRDM unit 14 is a control rod guide frame 16, which in the perspective view of FIG. 1 blocks from view the connecting rod (not shown in FIG. 1). Extending below the guide frame 16 is a plurality of control rods 18. FIG. 1 shows the control rods 18 in their fully inserted position in which the control rods 18 are maximally inserted into the core former 12. In the fully inserted position, the spider or other connecting element is located at a lower location 20 within the control rod guide frame 16 (hence also not visible in FIG. 1). In the illustrative embodiment of FIG. 1, the CRDM unit 14 and the control rod guide frame 16 are spaced apart by a standoff 22 comprising a hollow tube having opposite ends coupled with the CRDM unit 14 and the guide frame 16, respectively, and through which the connecting rod (not shown in FIG. 1) passes. The lower end of the control rod guide frame 16 connects with a support plate 24, which may be an upper portion of the core former 12, or may be a separate plate mounted above the upper end of the core former 12.

FIG. 1 shows only a lower portion of the illustrative pressure vessel 10. In an operating nuclear reactor, an open upper end 26 of the illustration is connected with one or more upper pressure vessel portions that together with the illustrated lower portion of the pressure vessel 10 form an enclosed pressure volume containing the reactor core (indicated by the illustrated core former 12), the control rods 18, the guide frame 16, and the internal CRDM unit 14. In an alternative embodiment, the CRDM unit is external, located above the reactor pressure vessel. In such embodiments, the external CRDM is connected with the control rods by a control rod/CRDM coupling assembly in which the connecting rod extends through a portal in the upper portion of the pressure vessel.

Figure 2:
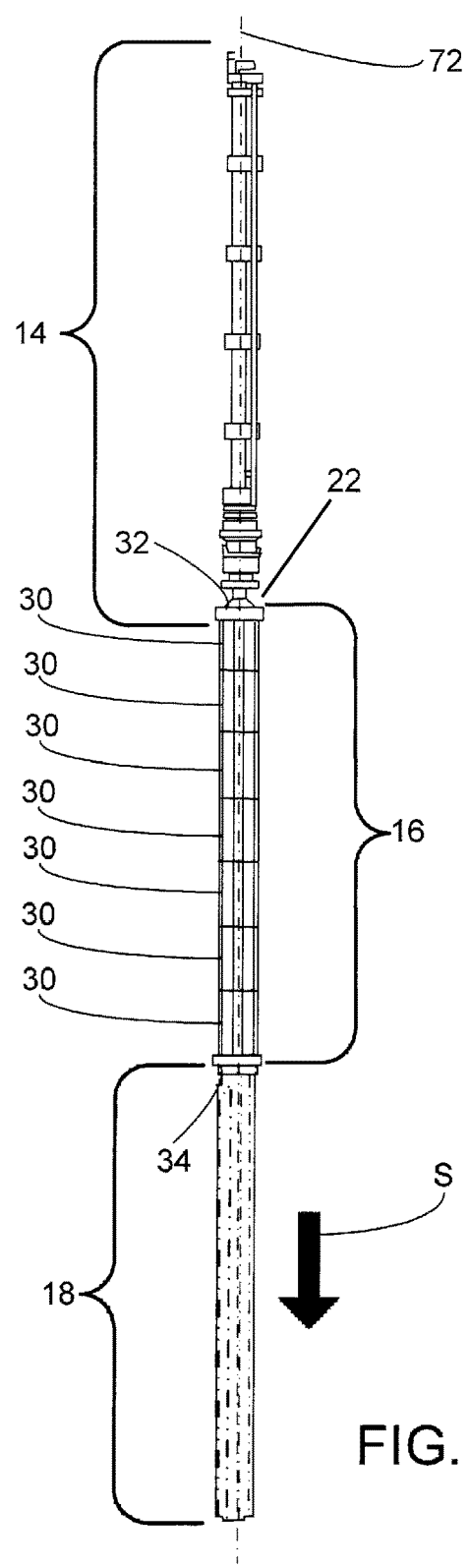
FIG. 2 diagrammatically shows a perspective view of the illustrative continuous control rod guide frame of FIG. 1 in context with a control rod drive mechanism (CRDM) and a bundle of control rods.

With reference to FIG. 2, the control assembly including the CRDM unit 14, the control rod guide frame 16, the intervening standoff 22, and the control rods 18 is illustrated isolated from the reactor pressure vessel. Again, the control rod/spider assembly is hidden by the control rod guide frame 16 and the standoff 22 in the view of FIG. 2.

Figure 3:
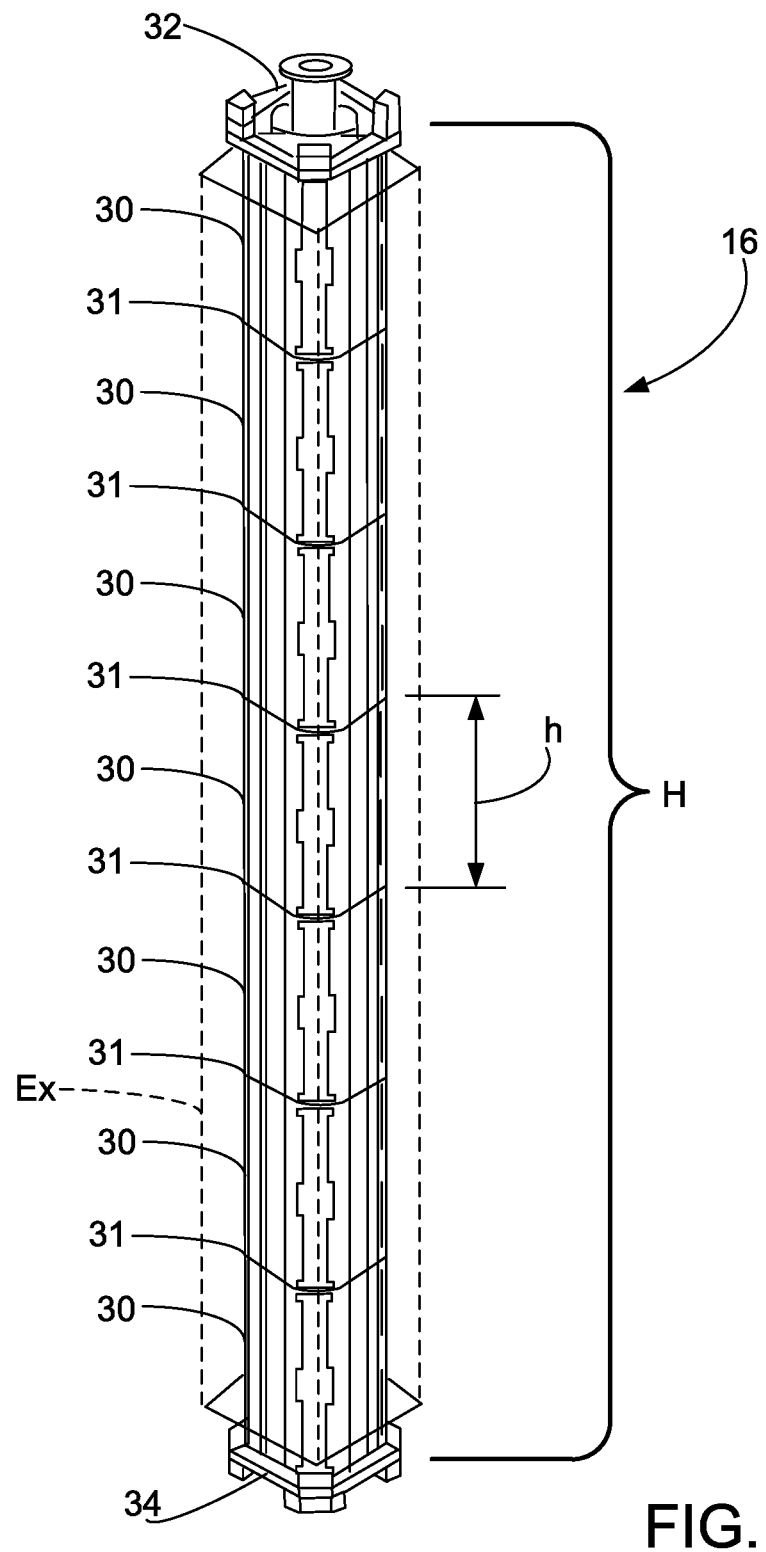
FIG. 3 diagrammatically shows a perspective view of the control rod guide frame of FIGS. 1 and 2.

With reference to FIG. 3, the control rod guide frame 16 is shown in perspective view and in isolation from the remaining components (such as the CRDM, control rods, and so forth). The control rod guide frame 16 is a continuous guide frame rather than being constructed of spaced apart guide plates. The guide frames disclosed herein, in general, comprise one or more columnar elements. The illustrative control rod guide frame 16 includes an illustrative seven columnar elements 30, which are identical and are stacked to form the illustrative control rod guide frame 16. However, the number of columnar elements can be one, two, three, four, five, six, the illustrative seven, eight, nine, ten, or more. Moreover, while the illustrative seven columnar elements 30 are all identical to each other, this is not required. For example, different columnar elements may have different heights, or the different columnar elements may variously include or omit fluid flow passages (optional features discussed further elsewhere herein), or so forth.

Each pair of adjacent columnar elements 30 is connected at an abutment 31. (This is not pertinent in the limiting case in which the number of columnar elements equals one, since in that case there are no adjacent columnar elements). Since there are seven illustrative columnar elements 30, there are 7−1=6 abutments 31. More generally, if there are N stacked columnar elements then there are N−1 abutments. The illustrative control rod guide frame 16 comprises a self-supporting stack of the (illustrative seven) columnar elements 30. There is no exoskeleton supporting the stack of columnar elements 30. (This is indicated diagrammatically in FIG. 3 by showing an exoskeleton Ex in phantom so as to indicate that the exoskeleton is omitted, that is, is not included in the control rod guide frame 16.) In other embodiments, however, it is contemplated to include an exoskeleton to provide some support for the stack of columnar elements.

Each columnar element 30 has a column height h, so that the illustrative control rod guide frame 16 in which the seven columnar elements 30 are identical has a column height H=7h. More generally, the height is the sum of the heights of the constituent columnar elements. In the limiting case of a guide frame comprising one columnar element, H=h. An upper end of the illustrative control rod guide frame 16 includes an upper plate 32 that may connect with the CRDM unit 14 via the standoff 22 (see FIG. 2), while a lower end of the illustrative control rod guide frame 16 includes a lower plate 34 that connects with the support plate 24 (see FIG. 1) which is an upper part of, or proximate to, the fuel core former 12. Although not shown, it is contemplated to include mounting blocks or other intermediate components to facilitate the connection of the guide frame 16 with the CRDM unit 14 and/or with the support plate 24. The foregoing height values neglect any height contribution of the upper and/or lower plates 32, 34 or of any mounting blocks or intermediate components.

Figure 4:
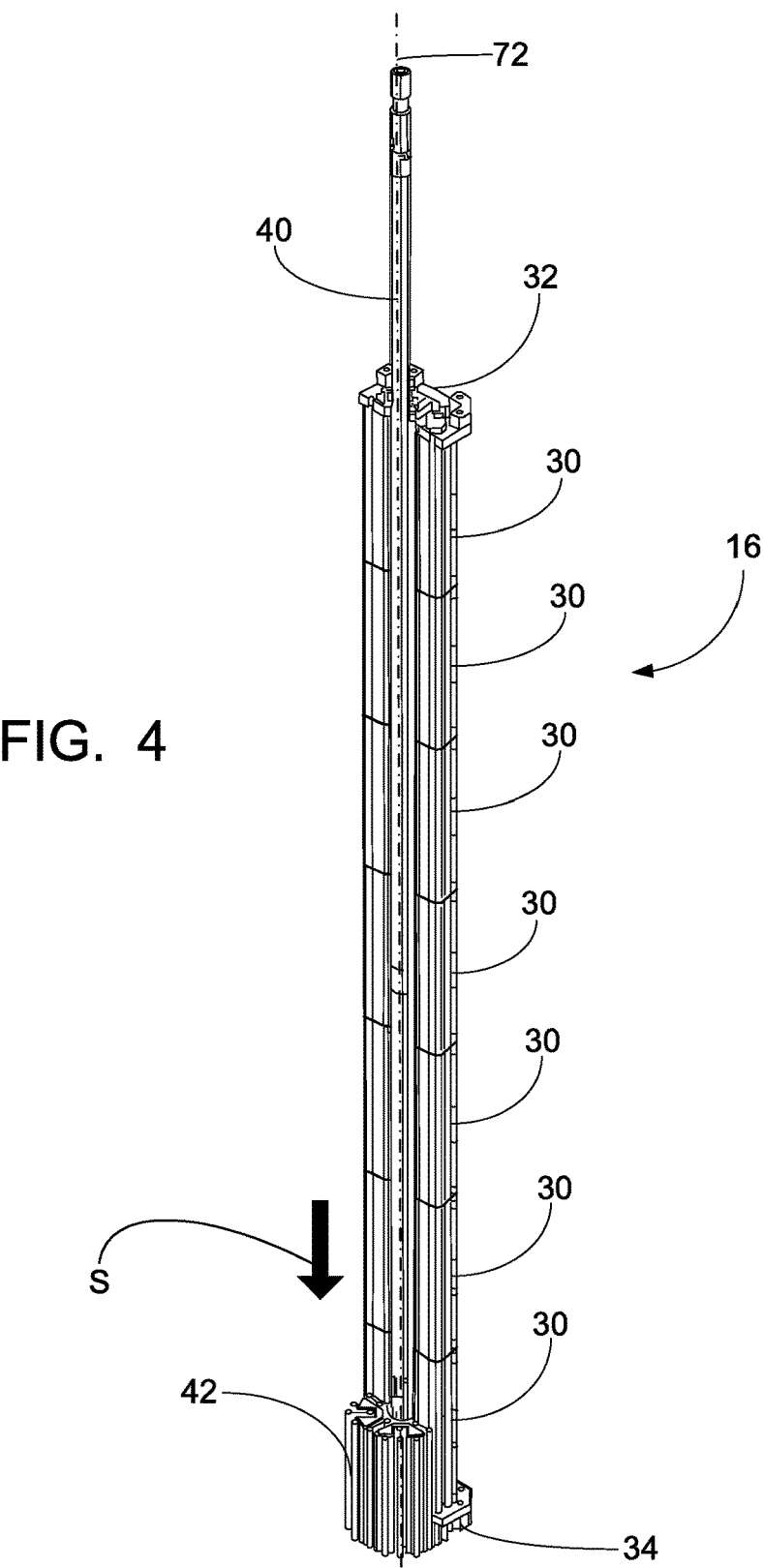
FIG. 4 diagrammatically shows a side sectional perspective view of the control rod guide frame of FIGS. 1-3, with the section revealing the connecting rod and coupling element.

With reference to FIG. 4, a perspective sectional view of the illustrative control rod guide frame 16 is shown, with the section revealing a connecting rod 40 and a coupling element 42 disposed inside the illustrative control rod guide frame 16. In FIG. 4, the upper end of the connecting rod 40 is shown extending above the guide frame 16, in isolation. As will be understood by comparing FIG. 4 with FIGS. 1 and 2, the upper end of the connecting rod 40 extends into and couples with the CRDM 14. FIG. 4 shows the configuration with the connecting rod/coupling element assembly 40, 42 in their most "downward" position, corresponding to the control rods (not shown in FIG. 4) fully extended into the reactor core (as shown in FIGS. 1 and 2).

In some embodiments, a spider serves as the coupling element for attaching a plurality of control rods to a single connecting rod. A spider typically comprises metal tubes or arms (typically made of stainless steel) extending generally radially outward from a central attachment point at which the spider attaches with the connecting rod, and optionally further includes additional supporting cross-members provided between the radially extending tubes. The spider is thus a lightweight, "spidery" structure having large lateral openings between the tubes or arms to reduce the actual surface area oriented broadside to the SCRAM direction. In illustrative FIG. 4, however, the coupling element 42 is a coupling element that has substantial elongation along the SCRAM direction S, and is bulky rather than having a lightweight "spidery" configuration as in a conventional spider.

Figure 5:
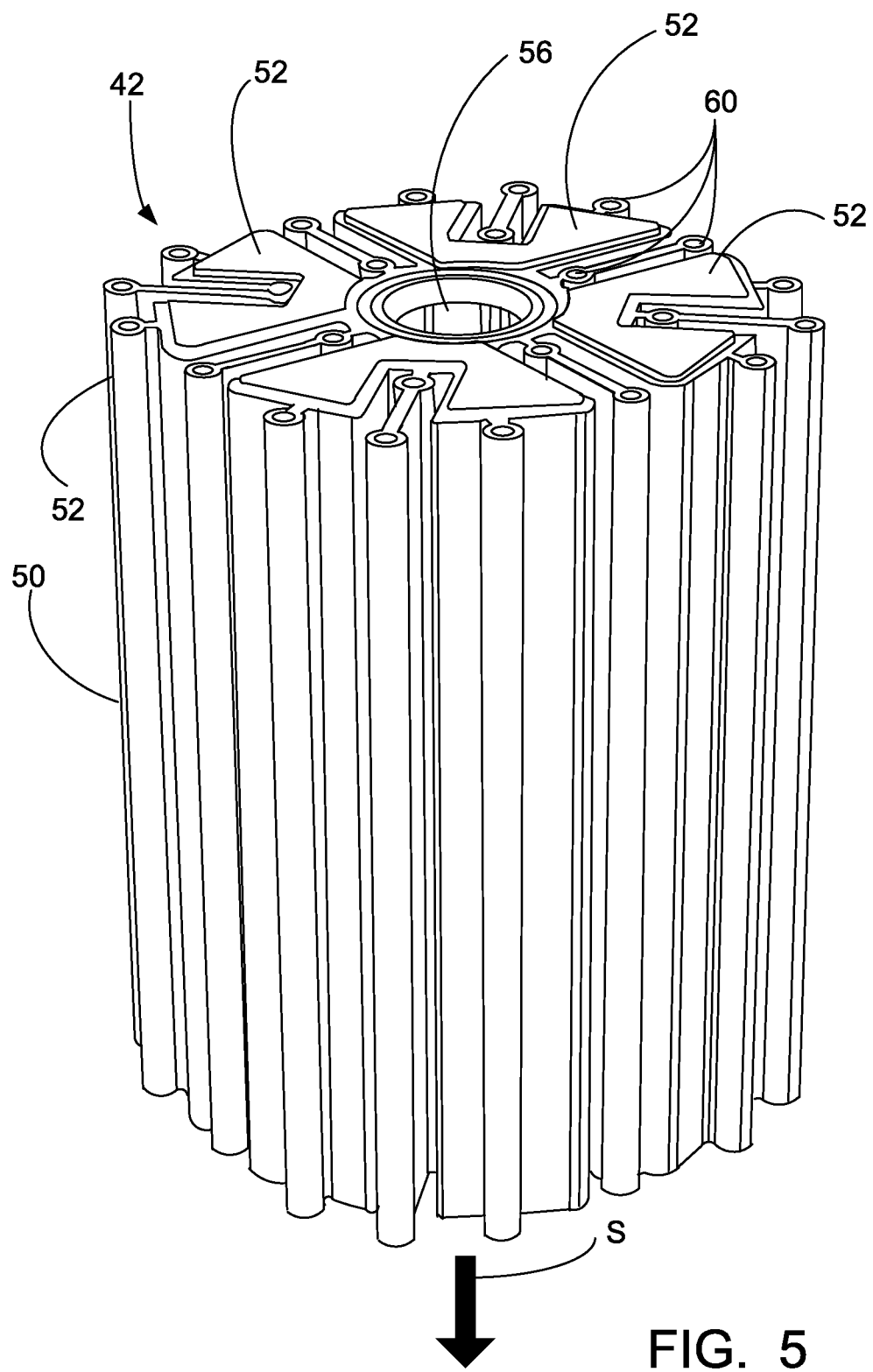
FIGS. 5 and 6 diagrammatically show a perspective view and a side sectional perspective view, respectively, of the coupling element of FIG. 4.
Figure 6:
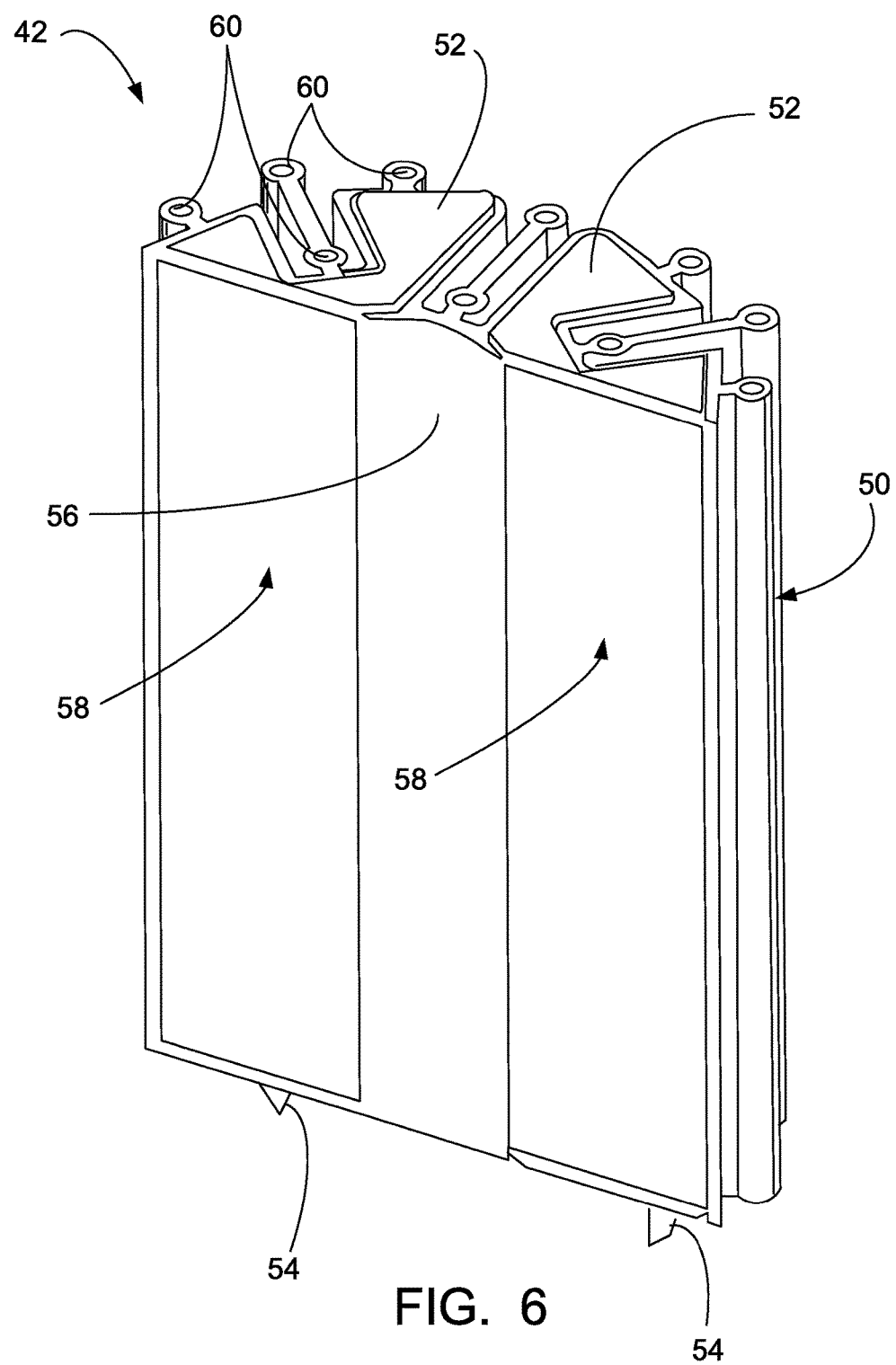

With reference to FIGS. 5 and 6, a perspective view and a side-sectional perspective view, respectively, of the coupling element 42 is shown. The coupling element 42 includes a substantially hollow casing 50 having upper and lower ends that are sealed off by upper and lower casing cover plates 52, 54. Four upper casing cover plates 52 are illustrated in FIG. 5 and two of the upper casing cover plates 52 are shown in the side-sectional perspective view of FIG. 6. The tilt of the perspective view of FIG. 5 occludes the lower cover plates from view, but two of the lower cover plates 54 are visible "on-edge" in the side-sectional view of FIG. 6. The illustrative coupling element 42 includes four lower casing cover plates 54 arranged analogously to the four upper casing cover plates 52 illustrated in FIG. 5. The coupling element 42 is cylindrical with a cylinder axis parallel with the SCRAM direction S and a uniform cross-section transverse to the cylinder axis. That cross-section is complex, and defines a central passage 56 for coupling with the lower end of the connecting rod 40.

To increase the weight (or average density) of the coupling element 42, the casing 50 defines four cavities spaced radially at 90° intervals around the central passage 50. These cavities are filled with a filler 58 (only two filled cavities are visible in the sectional view of FIG. 6) of a dense material. The cross-section of the hollow casing 40 also defines numerous small passages 60 (that is, small compared with the central passage 56), only some of which are labeled in FIGS. 5 and 6. These small passages 60 pass completely through the casing 50, and provide mounting points for attachment of the upper ends of the control rods 18.

The optional filler 58 increases the mass (or average density) of the coupling element 42 in order to increase SCRAM force and speed. The filler 58 comprises a heavy material, where the term "heavy material" denotes a material that has a higher density than the stainless steel (or other material) that forms the hollow casing 50. For example, the filler 58 may comprise tungsten, depleted uranium, molybdenum, or tantalum, by way of some illustrative examples. Alternatively, the cavities can be omitted and the entire coupling element 42 can be made of stainless steel, by way of example. Such a configuration still provides a substantial weight increase over a conventional lightweight, "spidery" spider due to the extension of the coupling element 42 along the SCRAM direction S and due to its more "filled" configuration.

The illustrative "heavy" coupling element 42 is described in further detail in U.S. patent application Ser. No. 12/862,124 filed Aug. 24, 2010 and titled "Terminal elements for coupling connecting rods and control rods in control rod assemblies for a nuclear reactor", which is incorporated herein by reference in its entirety. The illustrative "heavy" coupling element 42 has advantages such as providing greater SCRAM force and consequently faster shutdown (in the case of shutdown or hybrid control rods). However, more generally the control rod guide frames 16 disclosed herein are suitably used with conventional spiders, or with coupling elements such as the illustrative coupling element 42, or with no connecting element at all (for example, a configuration in which a single control rod is directly coupled with the lower end of a connecting rod).

Figure 7:
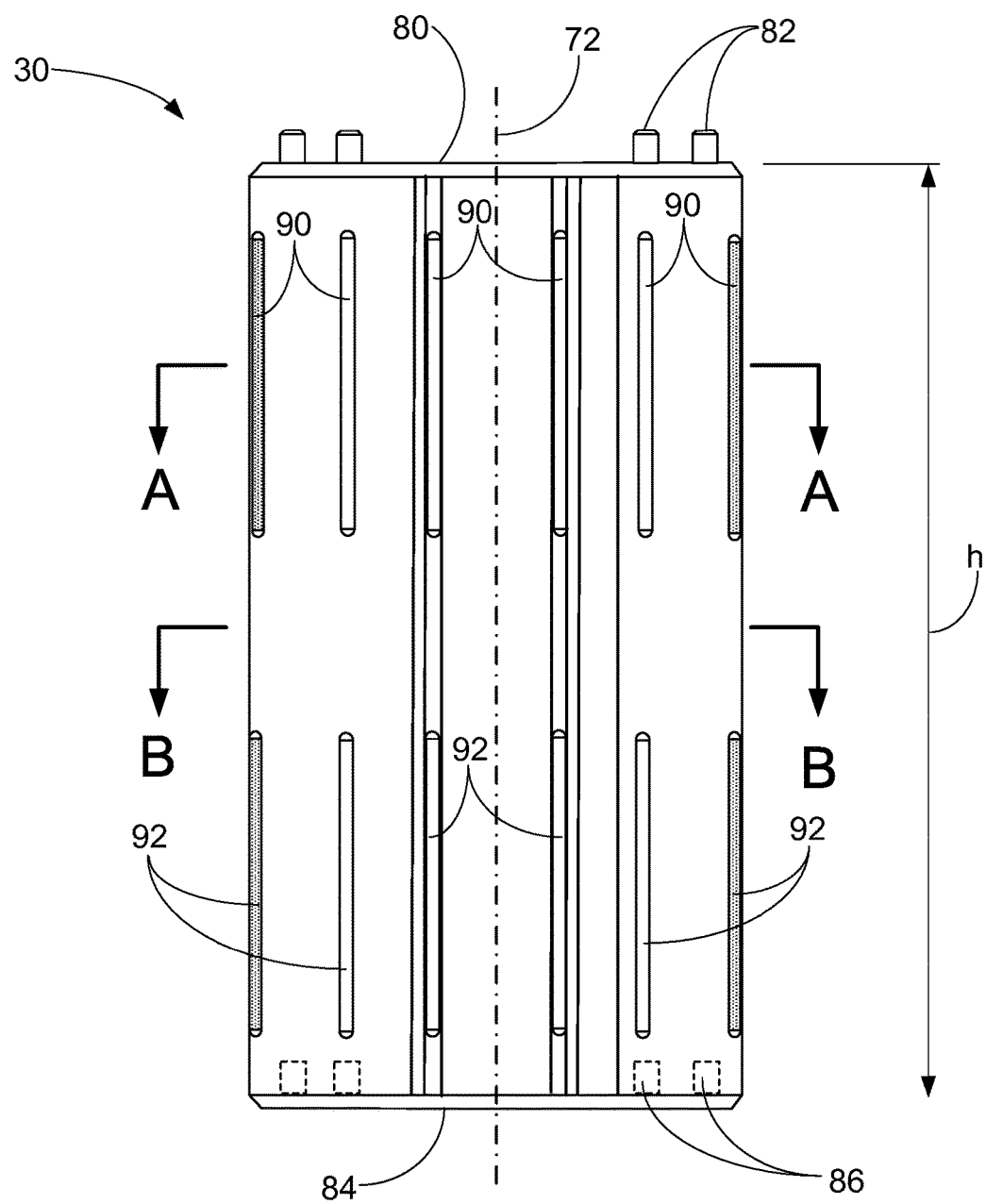
FIG. 7 diagrammatically shows a side view of one of the columnar elements comprising the control rod guide frame of FIGS. 1-4.
Figure 8:
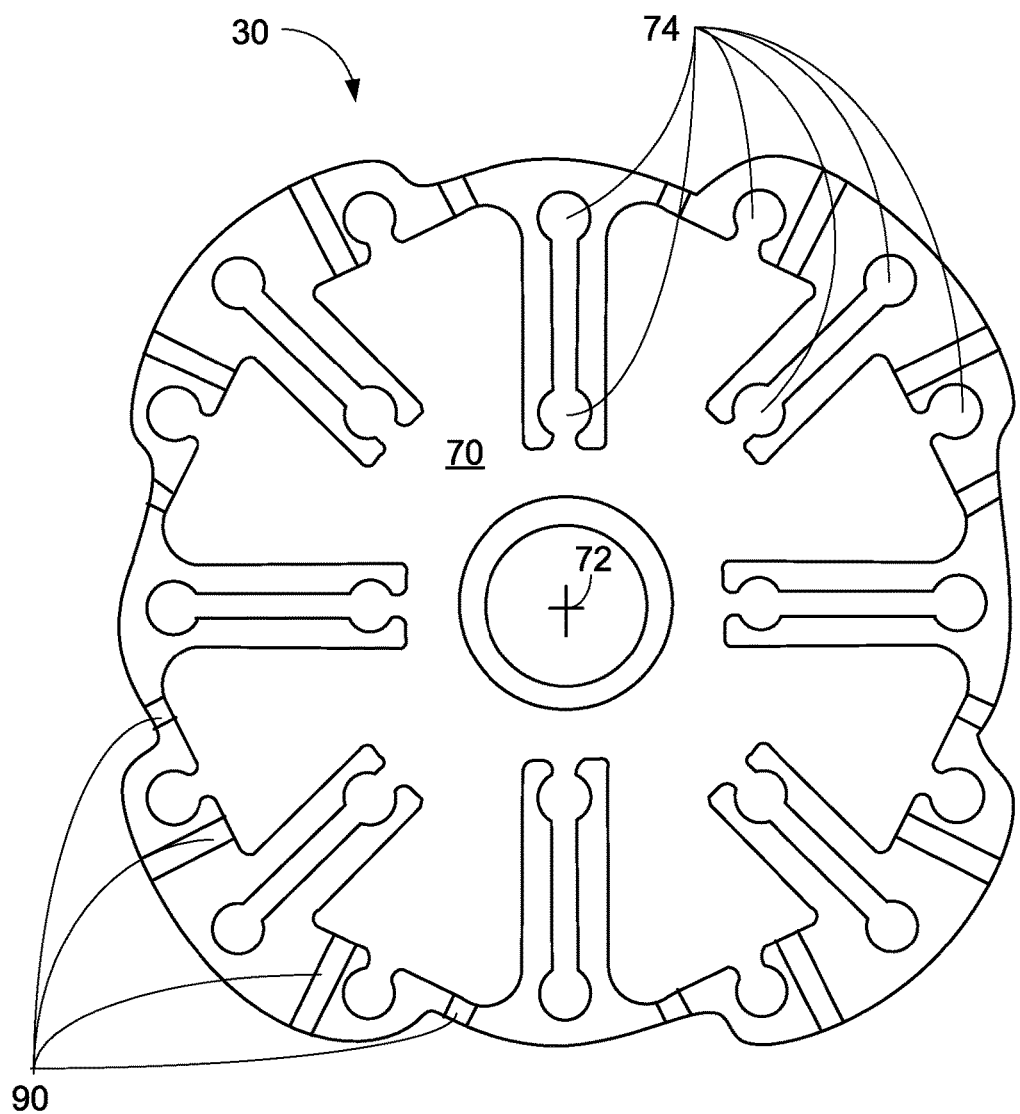
FIGS. 8 and 9 show Section A-A and Section B-B, respectively, which are indicated in FIG. 7.
Figure 9:
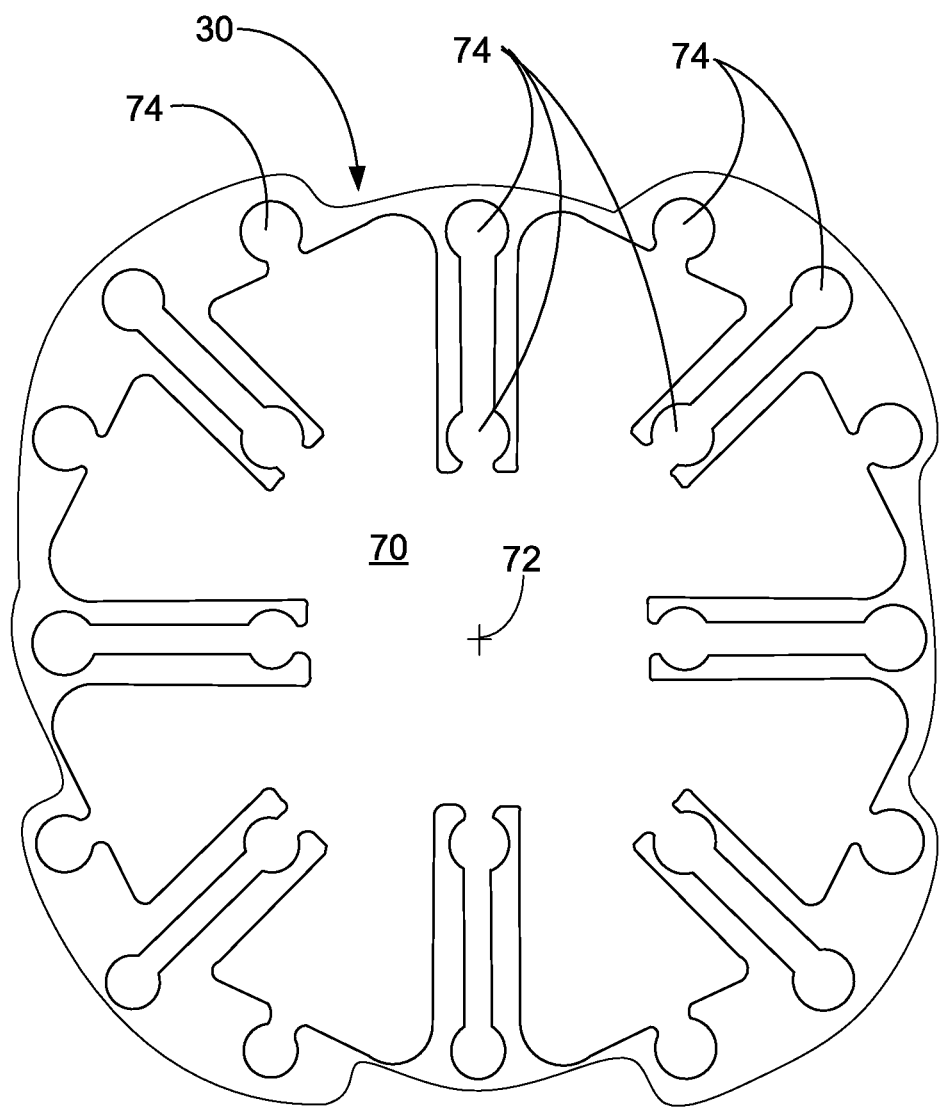

With returning reference to FIGS. 3 and 4 and with further reference to FIGS. 7-9, the illustrative control rod guide frame 16 is further described. FIG. 7 illustrates a side view of one columnar element 30. FIGS. 8 and 9 show respectively Section A-A and Section B-B indicated in FIG. 7. As best seen in the sectional views of FIGS. 8 and 9, the columnar element 30 defines a central passage 70 through the columnar element 30. The central passage 70 has a constant cross-section as a function of position along the central passage 70 (for example, having substantially the same cross-section at the position of Section A-A and at the position of Section B-B, as shown in respective FIGS. 8 and 9). Said another way, the columnar element 30 (or, equivalently, guide frame 16 comprising the stack of columnar elements 30) defines a central axis 72 (labeled in each of FIGS. 2, 4, 7, 8, and 9, where in FIGS. 8 and 9 the sectional views are down the central axis 72) and the central passage 70 lies along the central axis 72 and has a constant cross-section in the plane transverse to the central axis at positions along the central axis. The connecting rod 40 and the control rods 18 are assembled to be parallel with the central axis 72 defined by the control rod guide frame 16. (Or, viewed in the alternative, the control rod guide frame 16 is assembled such that its central axis 72 is in parallel with the connecting rod 40 and the control rods 18). In the illustrative example (see FIG. 4), the connecting rod 40 and coupling element 42 are centered on the central axis 72. Such centering provides advantageous a balance-enhancing symmetry to the moving assembly; however, it is also contemplated for the connecting rod and/or the spider or other coupling element to be positioned "off-center" respective to the central axis 72. It will also be noted that the SCRAM direction S is along (or parallel with) the central axis 72.

The central passage 70 is sized and shaped to receive the illustrative coupling element 42 (or to receive the spider, in embodiments employing a spider as the coupling element) with a relatively small tolerance between the outer surface of the coupling element 42 (defined by the casing 50 in the illustrative example) and the surfaces of the central passage 70. The central passage 70 also includes control rod guidance channels 74 (labeled in FIG. 8) which are parallel with the central axis 72 and extend completely through the columnar element 30. Each control rod guidance channel 74 is sized and positioned to receive a corresponding control rod of the plurality of control rods 18. Because the central passage 70 (including the guidance channels 74) has a constant cross-section as a function of position along the central passage, any portion of a control rod that is disposed in the central passage 72 (and more particularly in the control rod guidance channel 74 aligned with that control rod) is guided by the central passage 70 (and more particularly is guided by the surfaces of the aligned control rod guidance channel 74) over the entire length of the portion of the control rod that is disposed in the central passage. Said another way, the control rod guidance channel 74 provides continuous guidance for the entire portion of the control rod that is withdrawn into the control rod guide frame 16.

Phraseology such as "guidance" or "guiding surfaces" denote surfaces or structures (e.g., the guidance channels 74) that guide the control rods insofar as they keep the control rod straight in its intended orientation within a specified tolerance. Typically, the guidance channels 74 have a slightly larger diameter as compared with the control rods, with the difference defining the allowed tolerance of movement of the guided control rod. If the control rod attempts to deviate beyond this tolerance, for example due to mechanical vibrational force or incipient bowing of the control rod, the control rod cams against the guiding surfaces of the guidance channels 74 to prevent vibrational movement or bowing of the control rod beyond the allowable tolerance. By making the guidance channel 74 slightly larger than the control rod diameter, the control rod is allowed to move down or up (that is, inserted into or withdrawn from the core) without frictional resistance from the guidance channel 74. However, it is also contemplated for the guidance channel 74 to be sized to precisely match the diameter of the control rod, so that the motion tolerance is minimized at the cost of some frictional resistance to control rod insertion or withdrawal. The foregoing sizing of the guidance channels 74 is also suitably chosen taking into account any differential thermal expansion of the control rods compared with the stainless steel or other material comprising the columnar element 30.

It will be noted that the illustrative guidance channels 74 do not form complete closed cylindrical passages, but rather are partially "connected" with the main volume of the central passage 70. The central passage 70, including the guidance channels 74, thus has a simply connected cross-section without any "detached" passage cross-section portions. This allows the assembly including the coupling element 42 and the coupled bundle of control rods 18 to move unimpeded through the length of the central passage 70. Each guidance channel 74 surrounds the circular cross-section of its guided control rod over a sufficient perimeter so as to prevent movement of the control rod beyond allowable tolerance in any direction. Moreover, while the illustrative guidance channels 74 are shaped to guide control rods having circular cross-sections, it is also contemplated for the control rods to have square, hexagonal, octagonal, or other cross-sections, in which case the corresponding control rod guidance channels have correspondingly shaped cross-sections that again are typically slightly enlarged compared with the control rod in correspondence with the allowable motion tolerance for the guided control rod.

Figure 10:
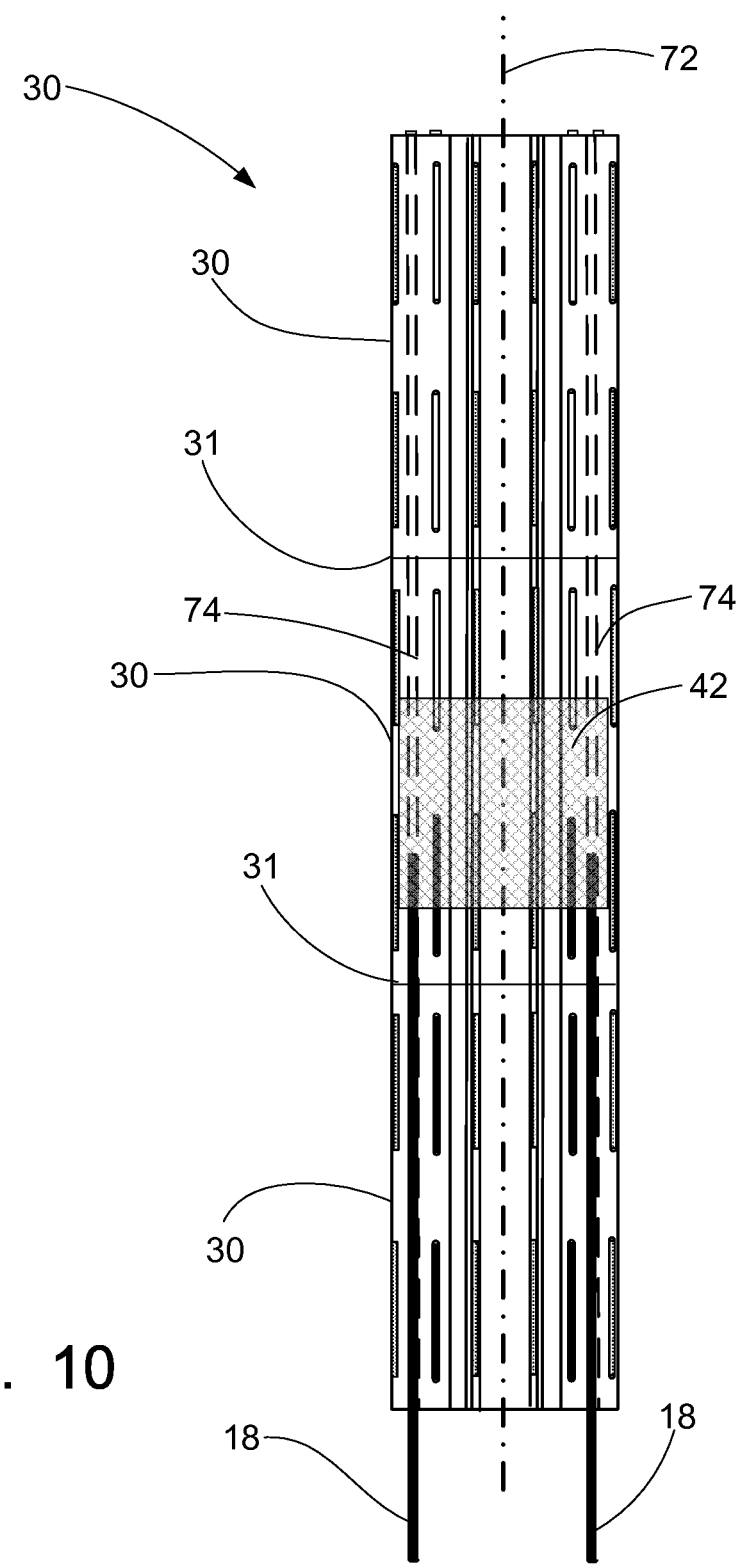
FIG. 10 diagrammatically shows a side view of a stack of three columnar elements of the embodiment shown in FIGS. 7-9, with the contained coupling element and two representative control rods shown in phantom.

With continuing reference to FIGS. 7-9 and with further reference to FIG. 10, in embodiments (such as the illustrative embodiment) in which two or more columnar elements 30 are stacked to define the guide frame 16, the central passage 70 of each columnar element 30 is sized and shaped the same and is aligned in the stacking so as to define a "stacked columnar passage" having a constant cross-section as a function of position along the "stacked central passage". Said another way, guide frame 16 comprising the stack of columnar elements 30 defines the central axis 72, and the common central passage 70 of the stack lies along the central axis 72 and has a constant cross-section in the plane transverse to the central axis 72. The alignment of the columnar elements 30 includes aligning the control rod guidance channels 74 over the entire stack. This is diagrammatically shown in FIG. 10, which illustrates a stack of three columnar elements 30. Shown in phantom are two illustrative control rod guidance channels 74, with the coupling element 42 shown in phantom at a position in the middle columnar element 30 of the stack. Two illustrative control rods 18 extend downward from the coupling element 42, and are partway withdrawn into the stack of columnar elements 30. In this position, portions of the two illustrative control rods 18 are disposed in the aligned control rod guidance channels 74 of the lowest columnar element 30 and part of the middle columnar element 30 of the stack. Thus, these portions of the two illustrative control rods 18 are provided with continuous guidance along the entire length of the portions disposed in the stack.

With reference to FIGS. 3 and 7, the stack of columnar elements 30 comprising the control rod guide frame 16 is optionally a self-supporting stack in which the exoskeleton Ex is omitted. Toward this end, at each abutment between adjacent columnar elements 30, one columnar element includes an abutting end with a first set of mating features and the other columnar element includes an abutting end with a second set of mating features. The first and second sets of mating features are sized and shaped to mate together in the abutment. FIG. 7 illustrates an example, in which the columnar element 30 has a first (upper) abutting end 80 having a first set of mating features which in the illustrative example comprise protruding stubs 82, and also has a second (lower) abutting end 84 having a second set of mating features which in the illustrative example comprise recessed holes 86 (shown in phantom in FIG. 7). When one columnar element 30 is stacked on top of another, the recessed holes 86 in the abutting end 84 of the higher columnar element receive and mate with the protruding stubs 82 of the abutting upper end 80 of the lower columnar element. Such mating features assist in ensuring proper alignment, so that the central passages 70 of the stacked columnar elements form a continuous well-aligned passage through the entire guide frame 16. Depending on the nature of the mating features (e.g., the lengths of the stubs 82 and depths of the holes 86 in the illustrative example), the mating features may also provide some structural support contributing to the self-support of the stack.

In some embodiments, the stack of two or more columnar elements has a constant outer perimeter as a function of position along the central passage 70. This is the case for the illustrative stack of columnar elements 30. Such a configuration provides advantages such as enhanced interchangeability of the constituent columnar elements, and simplified design of the usage of space within the reactor pressure vessel. However, it is also contemplated for the stack of two or more columnar elements to have an outer perimeter that varies as a function of position along the central passage 70.

An advantage of the continuous guidance is that control rod bowing is suppressed or eliminated, which allows for higher SCRAM driving force and faster reactor shutdown times. However, these advantages can be reduced if hydraulic pressure builds up in the central passage 70 during a SCRAM so as to resist insertion of the control rods. Such a pressure buildup may be enhanced if the "bulky" coupling element 42 is used, since it does not provide substantial openings for flow of the primary coolant fluid past the coupling element 42. One way to alleviate hydraulic pressure buildup in the central passage 70 during a SCRAM is to employ a spider or other coupling element having substantial openings for flow of the primary coolant fluid past the spider or other coupling element. However, this approach reduces the weight of the coupling element, which may be disadvantageous.

With reference to FIGS. 7 and 8, an additional or alternative way to alleviate hydraulic pressure buildup in the central passage 70 during a SCRAM is to include fluid flow passages in one or more of the columnar elements to provide fluid communication between the central passage 70 and the exterior of the columnar element. In the illustrative example, each columnar element 30 includes flow passages comprising an upper set of slots 90 and a lower set of slots 92. The slots 90, 92 are formed into the body of the columnar element 30, and are not coextensive with the height h of the columnar element 30 (and hence are not part of the central passage 70 which passes through the columnar element 30). In this regard, notice that illustrative Section A-A shown in FIG. 8 passes through the slots 90, and so the slots 90 are visible in Section A-A. In contrast, illustrative Section B-B shown in FIG. 9 passes between the slots 90 and the slots 92, and so no slots are visible in Section B-B. In the illustrative embodiment the control rod guide frame 16 comprises a stack of seven identical columnar elements 30, each of which include the slots 90, 92. More generally, however, it is contemplated to include fluid flow passages in only some of the columnar elements. The slot-shaped fluid flow passages 90, 92 are illustrative examples, and other shapes and dimensions of fluid flow passages are also contemplated, such as holes (square, circular, or otherwise-shaped), spiraling slots, or so forth.

Figure 11:
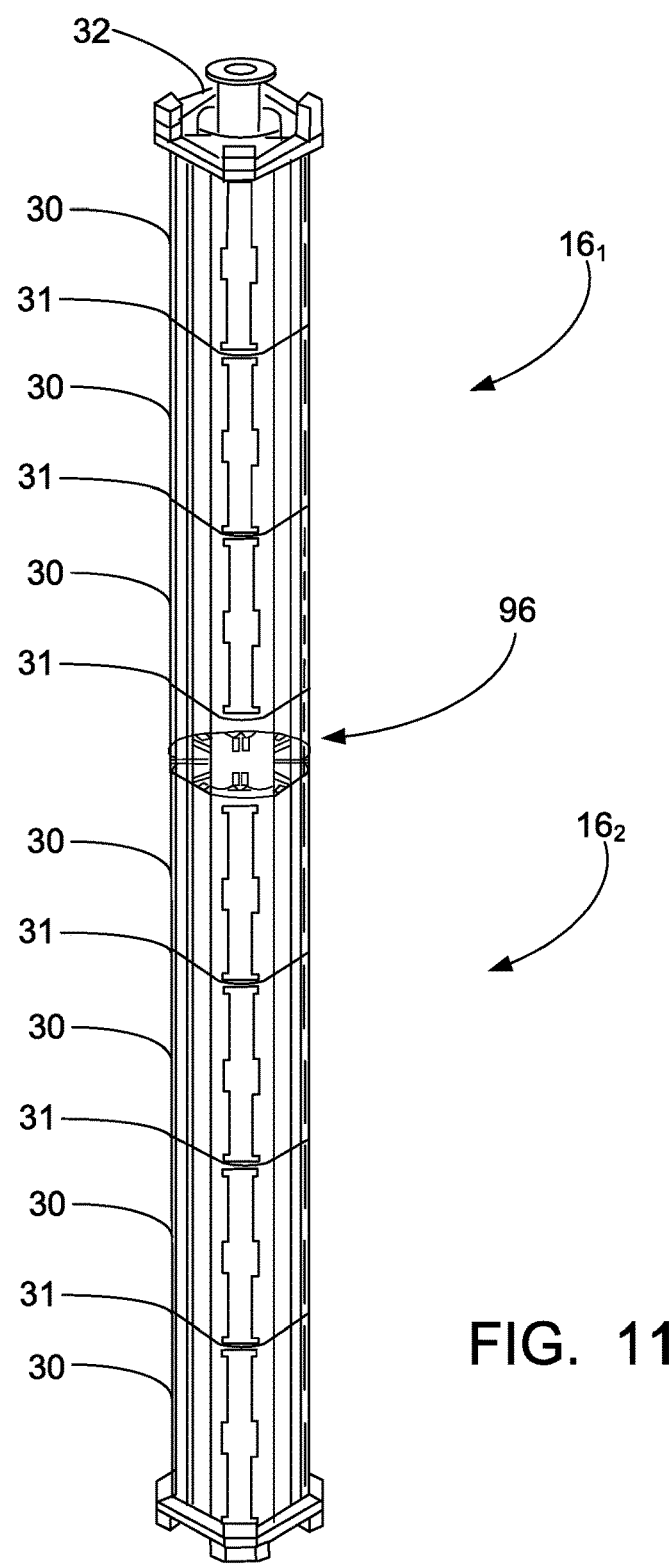
FIG. 11 diagrammatically shows a perspective view of an alternative control rod guidance structure comprising two spaced apart continuous control rod guide frames.

With reference to FIG. 11, the disclosed control rod guide frame comprising a stack of one or more columnar elements defining a central passage of constant cross-section can be employed in a spaced-apart combination to obtain the substantial benefit of continuous guidance while reducing the total amount of material. FIG. 11 shows a control rod guidance structure comprising an upper continuous control rod guide frame $16_1$ and a lower continuous control rod guide frame $16_2$ which are spaced apart by a spacer 96. The two continuous control rod guide frames $16_1$, $16_2$ are similar to the continuous control rod guide frame 16, except that they include fewer columnar elements 30 and have variant terminations. More particularly, the upper continuous control rod guide frame $16_1$ includes three columnar elements 30 and hence includes two abutments 31; while the lower continuous control rod guide frame $16_2$ includes four columnar elements 30 and hence includes three abutments 31. The upper continuous control rod guide frame $16_1$ also omits the lower plate 34 in favor of a lower connection with the spacer 96, and similarly the lower continuous control rod guide frame $16_2$ omits the upper plate 32 in favor of an upper connection with the spacer 96. A potential advantage of a configuration such as that of FIG. 11 is that the spacer 96 can be made with large gaps to alleviate hydraulic pressure buildup in the central passage 70 during a SCRAM, so that it serves a similar purpose to the slots 90, 92. A potential disadvantage of the spacer 96 is that it presents a discontinuity in the control rod guidance. Thus, tradeoffs can be made between the "openness" of the control rod guidance structure (which is promoted by including more spacers of larger height) and the guidance continuity (which is promoted by fewer spacers of lower height, or no spacers at all as per the guide frame 16). It will be noted that in the control rod guidance structure of FIG. 11, each of the constituent guide frames $16_1$, $16_2$ provide continuous guidance along their respective lengths (or heights). This continuous guidance tends to bias the control rods into the "straight" configuration, which may suppress control rod bowing even in the unguided spacer 96.

The columnar elements 30 are suitably made of stainless steel, although other materials are also contemplated. Manufacturing of the columnar elements 30 can employ various techniques, such as casting, extrusion, or electrical discharge machining (EDM). After initial formation by casting, extrusion, or EDM, the castings are optionally machined to meet specified tolerances. The recessed holes 86 are suitably made by drilling, while the protruding stubs 82 are suitably separately manufactured components that are welded or otherwise secured in holes drilled in the columnar element 30. A suitable number of one or more columnar elements 30 are then stacked on top of each other, assisted by mating of the optional mating features 82, 86, to reach the specified overall height of the guide frame. Alternatively, as shown in FIG. 11, two or more such continuous guide frames can be assembled in a spaced apart fashion to reach the specified overall height.

An advantage of the disclosed self-supporting stacked continuous guide frames is the optional elimination of an external frame (that is, exoskeleton), with anchoring of the guide frame provided by the upper and lower plates 32, 34 which serve as attachment locations for both the guide frame and optional mounting blocks (not shown) that facilitate the guide frame mounting.

Another advantage of the disclosed stacked continuous guide frames is reduced manufacturing labor and reduced welding of small components. The illustrative guide frame 16 can be constructed using only tack welds at the abutments 31 between adjacent columnar elements 30. Some welding may also be applied at the interface of the stack and the upper and lower plates 32, 34, and at any mounting blocks used in the guide frame mounting. The optional fluid flow passages 90, 92 are suitably cut into the sides of the columnar elements 30 to reduce the likelihood of hydraulic pressure buildup in the central passage 70. It is also noted that such fluid flow passages 90, 92 may have the advantage of reducing the impact of the guide frame 16 on cross-flow of the primary coolant fluid.

As already mentioned, the columnar element 30 may be suitably formed by casting, extrusion, or EDM. In the latter technique (Electrical Discharge Machining or EDM), the columnar element 30 is cut out of a solid block of material (e.g., a solid block of stainless steel) to represent the geometry. Optionally, a rougher casting is first formed and the EDM is then used to refine the rough casting toward the final shape of the columnar element 30. Some suitable EDM manufacturing techniques include wire-cut EDM.

The constant cross-section central passage 70 and optional constant outer perimeter of the columnar element 30 is naturally conducive to formation by extrusion, which is another suitable approach for forming the columnar element 30. The use of extrusion to form the columnar element 30 is advantageous due to low cost, and because extrusion does not constrain the maximum height h of the columnar element 30. (By way of contrasting example, casting constrains the maximum height h to the maximum feasible casting mold size). This makes extrusion particularly well-suited for forming a columnar element of large height h, such as is typically needed in the case of a guide frame comprising a single columnar element. Using a single columnar element reduces the amount of labor and welding involved with manufacturing the guide frame, and eliminates the need to align a plurality of stacked columnar elements.

While a continuous constant cross section is preferred, in one alternative embodiment the cross section geometry tapers slightly along a vertical axis of at least on columnar element such that a degree of hydraulic resistance may be utilized to enable additional control of the component velocity during SCRAM. In another alternative embodiment the cross section geometry may vary slightly between and amongst multiple columnar elements.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A method comprising:

forming at least one columnar element defining a central passage having a constant cross-section;

constructing a control rod guide frame including the at least one columnar element;

constructing a control rod assembly comprising a plurality of control rods parallel aligned with the central passage of the control rod guide frame;

wherein the plurality of control rods is movable into and out of the central passage of the control rod guide frame, and wherein any portion of the at least one control rod disposed in the central passage is guided by the central passage over the entire length of the portion of the at least one control rod that is disposed in the central passage, wherein the control rod assembly comprises the plurality of control rods connected with a spider or other coupling element, and the spider or other coupling element is disposed in the central passage of the control rod guide frame and moves along the central passage as the plurality of control rods move into or out of the central passage, wherein the spider or other coupling element comprises:
 a frame comprising a first material and defining cavities; and
 a filler disposed in the cavities, the filler comprising a second material that is more dense than the first material.

2. The method as set forth in claim 1, wherein the forming comprises: defining at least one fluid flow passage providing fluid communication between the central passage and an exterior of the columnar element.

3. The method as set forth in claim 1, further comprising: installing the control rod guide frame in a nuclear reactor vessel; and operating the nuclear reactor vessel, the operating including adjusting a position of the plurality of control rods in a nuclear reactor core using the control rod guide frame to guide the plurality of control rods during the adjusting.

4. The method as set forth in claim 1, wherein: the forming comprises forming a plurality of the columnar elements; and the constructing comprises constructing the control rod guide frame by stacking the columnar elements end-to-end.

5. The method as set forth in claim 4, wherein:
the constructing further comprises forming mating features on ends of the columnar elements wherein the stacking includes mating the mating features on abutting ends of adjacent columnar elements.

6. The method as set forth in claim 1, wherein the forming comprises: extruding the at least one columnar element defining a central passage.

7. The method as set forth in claim 1, wherein the forming comprises: extruding the at least one columnar element comprising stainless steel.

8. The method as set forth in claim 1, wherein the forming comprises: casting the at least one columnar element defining a central passage.

9. The method as set forth in claim 1, wherein the forming comprises: forming the at least one columnar element defining a central passage using electrical discharge machining (EDM).

10. A method comprising:
forming a plurality of columnar elements defining a central passage having a constant cross-section;
constructing a control rod guide frame including the plurality of columnar elements by stacking the columnar elements end-to-end;
providing a control rod assembly comprising a plurality of control rods parallel aligned with the central passage of the control rod guide frame;
wherein the plurality of control rods is movable into and out of the central passage of the control rod guide frame, and wherein any portion of the at least one control rod disposed in the central passage is guided by the central passage over the entire length of the portion of the at least one control rod that is disposed in the central passage, and
wherein the control rod assembly comprises the plurality of control rods connected with a spider or other coupling element, and the spider or other coupling element is disposed in the central passage of the control rod guide frame and moves along the central passage as the plurality of control rods move into or out of the central passage.

11. The method of claim 10, wherein the spider or other coupling element comprises: a frame comprising a first material and defining cavities; and a filler disposed in the cavities, the filler comprising a second material that is more dense than the first material.

12. The method as set forth in claim 10, wherein the forming comprises one or more from the group comprising: extruding the plurality of columnar elements defining a central passage; extruding the plurality of columnar elements comprising stainless steel; casting the plurality of columnar elements defining a central passage; and forming the plurality of columnar elements defining a central passage using electrical discharge machining (EDM).

13. The method as set forth in claim 10, further comprising: installing the control rod guide frame in a nuclear reactor vessel; and operating the nuclear reactor vessel, the operating including adjusting a position of the plurality of control rods in a nuclear reactor core using the control rod guide frame to guide the plurality of control rods during the adjusting.

14. The method as set forth in claim 10, wherein: the providing further comprises forming mating features on ends of the columnar elements wherein the stacking includes mating the mating features on abutting ends of adjacent columnar elements.

15. The method as set forth in claim 10, wherein the forming comprises defining at least one fluid flow passage providing fluid communication between the central passage and the exterior of the columnar element.

* * * * *